United States Patent Office 3,553,188
Patented Jan. 5, 1971

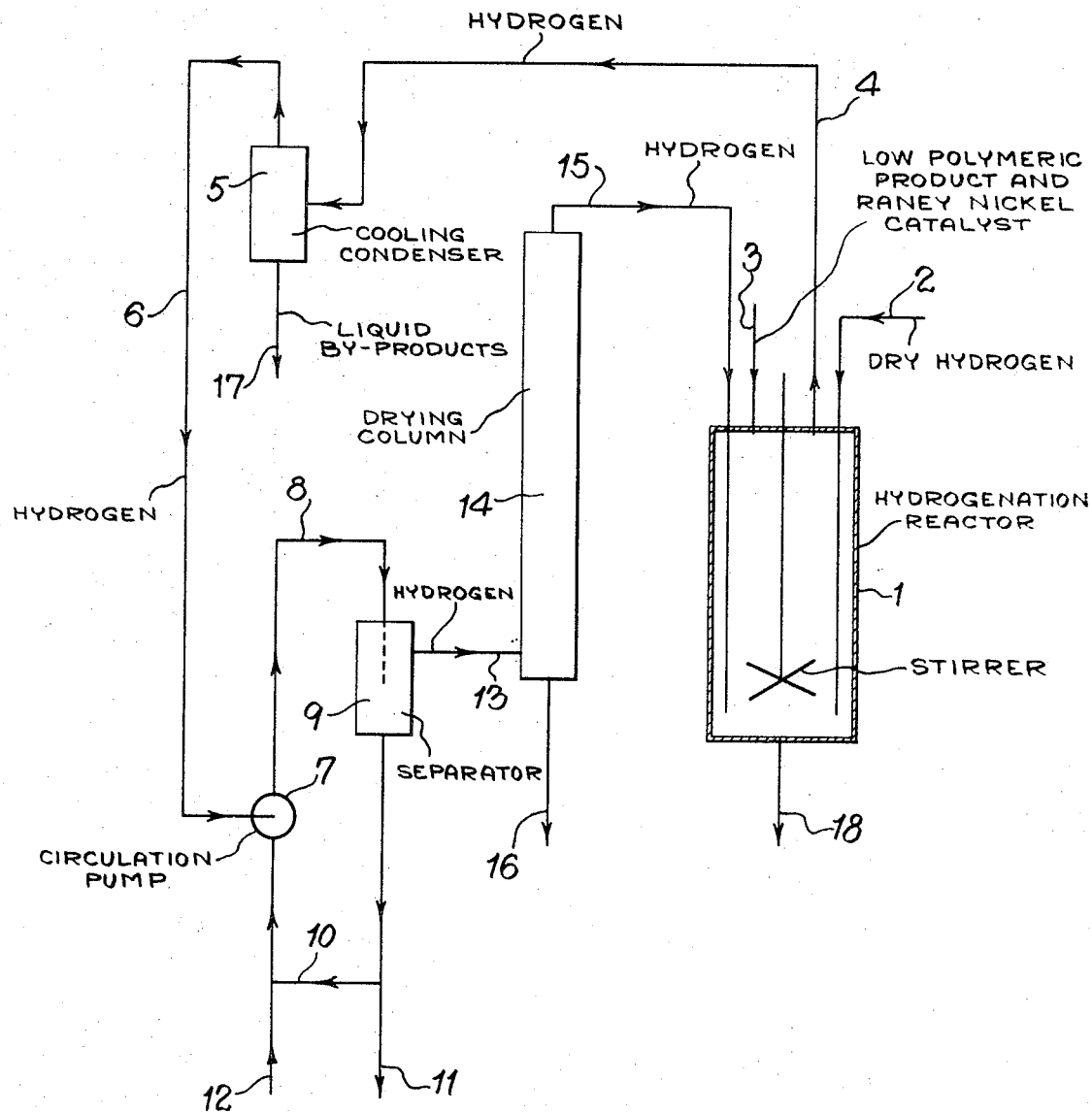

3,553,188
PROCESS FOR PRODUCING SATURATED
CARBOXYLIC ACIDS
Joseph Heckmaier and Gerhard Kunstle, Burghausen, Upper Bavaria, Germany, assignors to Wacker-Chemie G.m.b.H., Munich, Bavaria, Germany, a corporation of Germany
Filed Aug. 19, 1968, Ser. No. 753,499
Claims priority, application Germany, Aug. 21, 1967, 1,668,845
Int. Cl. C08h 17/36
U.S. Cl. 260—413
4 Claims

ABSTRACT OF THE DISCLOSURE

Process for producing saturated carboxylic acids by the catalytic hydrogenation of low-polymeric products which are formed during the reaction of ketene with ketones with 3 to 6 carbon atoms or aldehydes with 1 to 18, preferably 3 to 8 carbon atoms, which comprises heating the raw catalyst-containing low-polymeric product in a reaction zone in the presence of a Raney nickel hydrogenation catalyst at normal pressure and in the liquid phase at a gradually increasing reaction temperature within a range from 50 to 250° C., while circulating an excess quantity of dry hydrogen through said reaction zone.

BACKGROUND OF THE INVENTION

During the reaction of ketene and carbonyl compounds one can obtain, in the presence of acid or neutral catalysts, low-polymeric products of the general formula

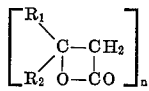

where
$R_1$=H, alkyl, cycloalkyl, aryl, aralkyl
$R_2$=H, alkyl, cycloalkyl, aryl, aralkyl
$n$=2 to about 50

By thermal splitting, if necessary in the presence of suitable known catalysts, the low-polymeric products can be converted into monomeric unsaturated carboxylic acids. From these one can produce saturated carboxylic acids by catalytic hydrogenation. (See Industrial and Engineering Chemistry, 1949, vol. 41, No. 4, p. 765.)

This method of preparing saturated carboxylic acids requires large technical expenditures. Moreover, during the thermal cracking there are formed, besides unsaturated carboxylic acids—also by-products, such as unsaturated hydrocarbons and carbon dioxide, or the starting components, namely ketene or carbonyl compounds or their secondary products.

These by-products are troublesome during the catalytic hydrogenation since they reduce the conversion or they cause a further secondary reaction. Therefore they must be removed beforehand. However, this purification is likewise associated with difficulties which cause further yield losses, because the unsaturated carboxylic acids are often unstable and tend to polymerize.

Attempts were also made to convert the lower polymeric products directly into saturated carboxylic acids by hydrogenating in the presence of a Raney-nickel catalyst under elevated pressure and temperature in an autoclave (see U.S. Pat. No. 2,484,497). However, since this produces the same by-products as in the thermal cracking, and these cannot be removed, the turnover is low. Also, the uniformity of the reaction process becomes questionable. Moreover, the use of an elevated hydrogen pressure necessitates a comparative high technical expenditure.

SUMMARY OF THE INVENTION

We have now discovered a process for producing saturated carboxylic acids by the catalytic hydrogenation of low-polymeric products of the general formula

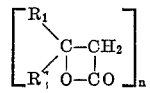

where
$R_1$=H, alkyl, cycloalkyl, aryl, aralkyl
$R_2$=H, alkyl, cycloalkyl, aryl, aralkyl
$n$=2 to about 50 which are formed during the reaction of ketene with ketones with 3 to 6 carbon atoms or aldehydes with 1 to 18, preferably 2 to 8 carbon atoms, in the presence of Raney-nickel as the hydrogenation catalyst. The process is characterized by the fact that we treat the raw, catalyst-containing low-polymeric products, suitably after removal of the excess carbonyl component, under normal pressure and in the liquid phase while continuously increasing the reaction temperature within a range from 50 to 250° C.—with excess, dry hydrogen and that the latter is circulated through the reaction zone.

DESCRIPTION OF THE PREFERRED EMBODIMENTS

According to the process of the invention all low-polymeric products which are formed during the reaction of ketene with carbonyl compounds, e.g. with formaldehyde, acetaldehyde, propionic aldehyde, n- and iso-butyraldehyde, crotonaldehyde, diethylacetaldehyde, capronaldehyde, acetone, methylethylketone, diethylketone, methylisobutylketone, benzaldehyde, n- and p-toluene-aldehyde, phenylacetaldehyde, furfurol and acetophenone, can be successfully processed into unsubstituted or substituted propionic acids. For instance, one obtains from:

ketene and formaldehyde: propionic acid
ketene and acetaldehyde: n-butyric acid
ketene and propionic aldehyde: n-valerianic acid
ketene and butyraldehyde: n-capronic acid
ketene and crotonaldehyde: n-capronic acid
ketene and diethylacetaldehyde: 4-ethyl-capronic acid
ketene and capronaldehyde: n-caprylic acid
ketene and acetone: isovalerianic acid
ketene and methylethylketone: 3-methyl valerianic acid
ketene and diethylketone: 3-ethyl valerianic acid
ketene and methylisobutylketone: 3,5-dimethylcapronic acid
ketene and benzaldehyde: β-phenylpropionic acid
ketene and phenylacetaldehyde: 4-phenylbutyric acid
ketene and acetophenone: 3-phenylbutyric acid When carrying out the process, the raw low-polymeric products are used for hydrogenation after removal of the excess carbonyl compounds, if any. No removal of the catalyst used during the ketene reaction is necessary.

In general the continuous or discontinuous hydrogenation occurs in the absence of a thinning agent. In this case the processing of the hydrogenation product is particularly economical, because the recovery of a thinning agent is unnecessary. However, one can also work in the presence of reaction-inert thinning agents, e.g. saturated hydrocarbons. These are particularly suitable whenever the low-polymeric products are of tough viscosity even at higher reaction temperatures.

In order to keep side reactions low it is necessary to keep the reaction temperatures low at the beginning of the hydrogenation, increasing them as the reaction progresses. It is useful to increase the speed of temperature rise at such a rate as to obtain an even-speed hydrogen intake during the hydrogenation process. Since the optimum starting and end temperatures at which the formation of by-products is lowest, are different depending on the nature of the low-polymeric products, the above temperature range can be different. In order to assure a good conversion, however, it will at any rate be necessary to attempt or reach a high final temperature.

Moreover, it is advantageous to subject the residue remaining after the distillative processing of the hydrogenation product in circulation to one more catalytic hydrogenation at high temperatures.

In order to obtain a good yield it is essential, in connection with the temperature control of our process, to add the hydrogen in dry form or to dry it continuously in the known manner while it is being circulated.

Also, the highest turnovers and speedy hydrogen absorption are achieved only if the gaseous by-products which are formed in small quantities in the circulating hydrogen are sluiced out in a washing zone that is charged with alkalines, and if the easily volatile, liquid by-products are sluiced out in a cooling zone. If necesary, the saturated carboxylic acid formed thereby can be separated continuously already during the hydrogenation, at the rate that it is being formed, from the hydrogenation mixture.

The accompanying drawing is a diagrammatic illustration of a system suitable for carrying out the process of the invention discontinuously.

As shown in the drawing, the process is carried out discontinuously as follows: The hydrogenation reactor 1 is supplied, through conduit 3, with a low-polymeric product and with Raney nickel. Under stirring this is heated to a starting temperature of about 50° C. and dry hydrogen in excess is piped in through conduit 2. While the reaction temperature is increased at the rate of the progressing conversion in such a manner that the hydrogen is always being taken up uniformly and quickly and that for instance at the end of the reaction the temperature is about 200° C. higher, excess hydrogen is being circulated. This is done by means of a circulation pump 7 which is driven by concentrated sodium hydroxide as the ring liquid. The sodium hydroxide is circulated through line 8 through the separator 9 and line 10. Thereby hydrogen is siphoned in from the reactor 1, piped through line 4 into the cooling device 5, piped on through line 6 to the liquid circulation pump 7 and from there it is piped together with the ring liquid through line 8 to the separator 9. While hydrogen escapes in the latter from the ring liquid and from there it is piped first through line 13 into the drying column 14 which is usefully supplied with a drying agent like caustic soda, and then through line 15 into reactor 1, the ring liquid is circulated as described above.

The small quantity of by-products that is obtained during the hydrogenation is sluiced out continuously in this manner. While the easily volatile, liquid by-products, e.g. alkene, alkane, acetic acid, are separated through line 17, the gaseous by-products like carbon dioxide are transformed in the liquid ring pump 7 to sodium carbonate and bound.

If the temperature is properly controlled and the boiling point of the carboxylic acids that are being formed is appropriate, these latter can be sluiced out through line 17 at the same rate as they are created.

Through line 11 sodium carbonate-containing sodium hydroxide is siphoned off, and the loss is equalized by piping in fresh sodium hydroxide through line 12. If the drying column is supplied with sodium hydroxide as the drying agent, small quantities of concentrated sodium hydroxide are obtained through line 16.

If no more hydrogen is taken up, the hydrogenation is interrupted and first the Raney nickel is withdrawn through line 18, and then the hydrogenation product. The Raney nickel can be used for further hydrogenations. The hydrogenation product is purified by fractional distillation, and the saturated carboxylic acid is obtained in pure form as the main fraction.

The advantage of the process is that one can transform low-polymeric products which are readily accessible from ketene and carbonyl compounds and which, as opposed to the monomeric $\beta$-lactones on which they are based, represent stable compounds, into saturated carboxylic acids in a technically simple manner, quickly and achieving high turnovers and good yields. Moreover, it is not necessary to hydrogenate under elevated hydrogen pressure or to subject the starting products to a pretreatment, such as a purification.

It is surprising that, in spite of high final reaction temperatures which are necessary to achieve a good turnover, it is possible to avoid side reactions at a much larger scale than has been known heretofore. Also remarkable is the purity of the saturated carboxylic acids obtained in the process.

Example 1

The apparatus used consists of a heatable hydrogenation reactor 1 equipped with a stirring mechanism, a condenser 5, a liquid ring pump 7 driven by concentrated sodium hydroxide as the ring liquid, the separator 9 and the drying column 14 which is supplied with sodium hydroxide.

(a) Production of the low-polymeric product.—214.2 weight parts of a mixture consisting of 4.2 weight parts tetra-n-butyl titanate and 210 weight parts crotonaldehyde containing 0.1 weight percent of 2,6-di-tert.-butyl-p-cresol are reacted with 84 weight parts of gaseous ketene at 90° C. From the resulting reaction product, the excess unconverted crotonaldehyde is withdrawn at 20 torr, and one obtains besides 34 weight parts of crotonaldehyde 264 weight parts of a raw, crotonaldehyde-free and catalyst-containing low-polymeric reaction product.

(b) Hydrogenation.—264 weight parts of the reaction product and 6 weight parts of Raney nickel are fed into the hydrogenation reactor 1 through line 3. Under stirring the contents are heated to 80° C. At the same time dry hydrogen in excess quantity is piped in through line 2 and circulated. This is done by means of the liquid ring pump 7 which is driven by a circulating (through line 8, separator 9, and line 10) concentrated sodium hydroxide as the ring liquid. By this hydrogen is siphoned in from the hydrogenation reactor 1, piped through line 4 into condenser 5—where the easily volatile, liquid by-products which were created on a small scale in reactor 1 by side reactions, are condensed and sluiced out through line 17. From there the hydrogen is siphoned in through line 6 into the liquid ring pump 7 where carbon dioxide is washed out from the circulating hydrogen gas by concentrated sodium hydroxide. Together with the sodium hydroxide the circulating hydrogen is carried on to the separator 9. In the latter the purified hydrogen can escape from the ring liquid. While the ring liquid is returned through line 10 into the liquid ring pump 7 once more, the hydrogen is first piped to the drying column 14, then through line 15 again into reactor 1. Sodium carbonate-containing sodium hydroxide is sluiced out through line 11. The loss of sodium hydroxide is equalized by adding fresh sodium hydroxide through line 12. Through line 16 one obtains little concentrated sodium hydroxide.

If at a final temperature of 180° C. no more hydrogen is absorbed, the process is shut off and through line 18 first the Raney nickel is withdrawn, and then the hydrogenation product. The latter is subjected to a vacuum fractionation, where one obtains 190.5 weight parts capronic acid (boiling point, 10 torr: 97.0 to 98.5° C., M.P.: 4.8° C.).

The residue remaining after fractionation is hydrogenated again at 160–200° C., as described above, and processed. There another 18 weight parts of pure capronic acid are obtained.

Example 2

(a) Producing the low-polymeric product.—221.4 weight parts of a mixture consisting of 5.4 weight parts tetra-n-butyl titanate and 216 weight parts butyraldehyde containing 0.1 weight percent of 2,6-di-tert.-butyl-p-cresol, are reacted with 84 weight parts of gaseous ketene at 78 to 80° C.

(b) Hydrogenation.—234 weight parts of this raw, butyraldehyde-free, catalyst-containing reaction product, with a molecular weight of 230 to 235, are admitted together with 6 weight parts of Raney nickel into the hydrogenation reactor 1, and hydrogenated as explained in Example 1. Hydrogenation is started at 50° C. and ended at 160° C., when no more hydrogen is taken up. During fractionation of the hydrogenation product one obtains as the main fraction 147 weight parts of pure capronic acid. The residue remaining after fractionation is hydrogenated again at 150 to 190° C., as stated in Example 1. The distillative processing yields another 21.5 weight parts of pure capronic acid.

Example 3

(a) Producing the low-polymeric product.—244.8 weight parts of a mixture consisting of 4.8 weight parts of tetra-i-butyl titanate and 240 weight parts diethylacetaldehyde containing 0.05 weight percent of 2,6-di-tert.-butyl-p-cresol, are reacted with 84 weight parts of gaseous ketene at 80 to 85° C.

(b) Hydrogenation.—289 weight parts of this diethyl-acetaldehyde-free, catalyst-containing reaction product are placed together with 7 weight parts of Raney nickel into the hydrogenation reactor 1 and hydrogenated as explained in Example 1. Hydrogenation is begun at 100° C. and ended at 210° C. when no more hydrogen is being taken up. By the distillative processing of the hydrogenation product one obtains 200.5 weight parts of 4-ethylcapronic acid (B.P. 12 torr: 120 to 121° C.).

Example 4

(a) Producing the low-polymeric product.—306.0 weight parts of a mixture consisting of 6 weight parts of tetra-n-propyl titanate and 300 weight parts of capronicaldehyde containing 0.2 weight percent of 2,6-di-tert.-butyl-p-cresol are reacted with 84 weight parts of gaseous ketene at 82° C.

(b) Hydrogenation.—291 weight parts of the capronic aldehyde-free, catalyst-containing reaction product are reacted with 7 weight parts of Raney nickel and hydrogenated as described in Example 1. Hydrogenation is begun at 70° C. and terminated at 210° C. The distillative processing of the hydrogenation product yields 168 weight parts of caprylic acid (B.P. 12 torr: 122 to 123° C.).

Example 5

(a) Producing the low-polymeric product.—238 weight parts of a mixture consisting of 4 weight parts of tetra-n-hexyl titanate and 234 weight parts of benzaldehyde containing 0.2 weight percent of 2,6-di-tert.-butyl-p-cresol, are reacted with 84 weight parts of gaseous ketene at 82° C.

(b) Hydrogenation.—300 weight parts of a raw, benzaldehyde-free, catalyst-containing reaction product are converted with 7 weight parts of Raney nickel and hydrogenated as described in Example 1. Hydrogenation is started at 60° C. and terminated at 220° C. During the distillative processing of the hydrogenation product one obtains 229.5 weight parts of β-phenylpropionic acid with a boiling point of 151–152° C./11 torr. The melting point of the acid is 48° C.

Example 6

(a) Producing the low-polymeric product.—114.4 weight parts of a mixture consisting of 4.4 weight parts tetra-n-butyl titanate and 110 weight parts acetaldehyde are converted with 42 weight parts of gaseous ketene at 20° C.

(b) Hydrogenation.—90 weight parts of this acetaldehyde-free, catalyst-containing reaction product are compounded with 2 weight parts of Raney nickel and hydrogenated as set forth in Example 1. Hydrogenation is begun at 60° C. and the reaction temperature is gradually increased to 195° C. The resulting n-butyric acid is discharged from the hydrogenation reactor 1, condensed out in condenser 5 and sluiced out together with the by-products through line 17. Hydrogenation is terminated when no more hydrogen is taken up and no more n-butyric acid is obtained through line 17. The mixture obtained through line 17 is fractionated and distilled. One obtains then 68.5 weight parts of pure n-butyric acid.

Example 7

(a) Producing the low-polymeric product.—A mixture consisting of 0.19 weight parts hexafluorphosphoric acid and 625 weight parts acetone are reacted at 0° C. with 228 weight parts of gaseous ketene. After removal of the unconverted acetone one obtains 479 weight parts of a yellow, wax-like reaction product with a molecular weight of 4000 to 5000.

(b) Hydrogenation.—479 weight parts of this reaction product are admitted together with 7 weight parts of Raney nickel into the hydrogenation reactor 1 and hydrogenated as stated in Example 1. Hydrogenation is begun at 50° C. After a reaction temperature of 120° C. is reached, the hydrogenation is interrupted for a short while and another 7 weight parts of Raney nickel are added. The reaction is completed at a final temperature of 180° C.

The resulting hydrogenation product is processed by distilling. As the main fraction one obtains 397 weight parts of pure isovalerianic acid. B.P. 12 torr: 74 to 75° C.). The residue remaining after distilling is hydrogenated again at 160 to 195° C. and the hydrogenation product is again processed by distilling. Another 43 weight parts of isovalerianic acid are thus obtained.

The invention claimed is:

1. In the production of saturated carboxylic acids by the catalytic hydrogenation of low-polymeric products of the general formula

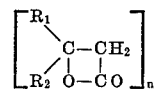

where
$R_1$=H, alkyl, cycloalkyl, aryl, aralkyl
$R_2$=H, alkyl, cycloalkyl, aryl, aralkyl
$n$=2 to about 50 which low-polymeric products are formed by reacting ketene with carbonyl compounds, the process which comprises removing the excess carbonyl component from the raw catalyst-containing low-polymeric product, and then heating said raw catalyst-containing low-polymeric product in a reaction zone in the presence of a Raney nickel hydrogenation catalyst at normal pressure and in the liquid phase to a reaction temperature which increases at the rate of the progressing conversion within a range from 50 to 250° C., while circulating an excess of dry hydrogen through said reaction zone.

2. Process according to claim 1, in which the hydrogen circulated through the reaction zone is thereafter cooled, then washed with an alkaline fluid, and then dried and recirculated through said reaction zone.

3. Process according to claim 1, in which the hydrogenation product is withdrawn from said reaction zone and purified by fractional distillation, and in which the residue from said fractional distillation is returned to said reaction zone for further catalytic hydrogenation.

4. Process according to claim 1, in which the carboxylic acid product is sluiced out of the reaction zone at the rate at which it is formed during the hydrogenation.

References Cited

UNITED STATES PATENTS

| 2,484,497 | 10/1949 | Hagemeyer | 260—514 |
| 3,308,155 | 3/1967 | Lundeen | 260—540 |

LEWIS GOTTS, Primary Examiner

E. G. LOVE, Assistant Examiner

U.S. Cl. X.R.

260—515, 540, 343.9, 347.5